Feb. 16, 1937.  L. F. BLUME ET AL  2,071,194
AUTOMATIC REGULATOR CONTROL
Filed Aug. 23, 1934
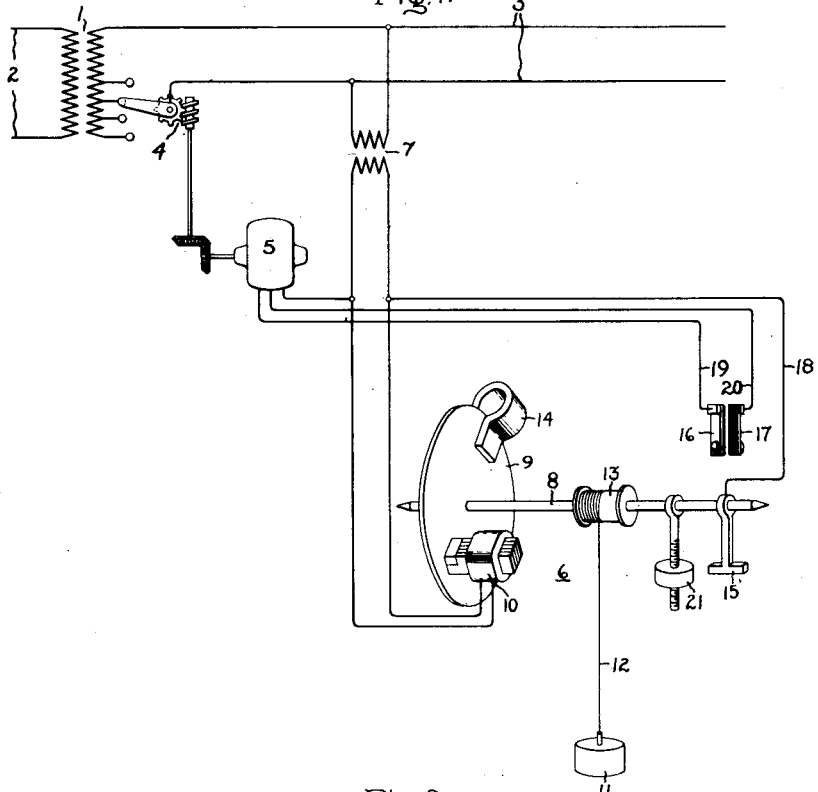
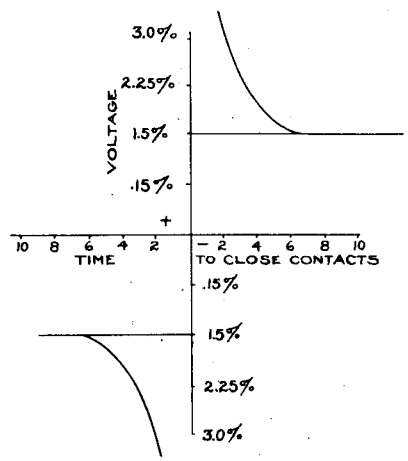
Inventors:
Louis F. Blume,
Salvatore Minneci,
by Harry E. Dunham
Their Attorney.

Patented Feb. 16, 1937

2,071,194

UNITED STATES PATENT OFFICE 2,071,194

AUTOMATIC REGULATOR CONTROL

Louis F. Blume and Salvatore Minneci, Pittsfield, Mass., assignors to General Electric Company, a corporation of New York Application August 23, 1934, Serial No. 741,167

8 Claims. (Cl. 171—119)

Our invention relates to automatic regulator control means and more particularly to a regulator control relay having an inverse time delay characteristic.

It is usually considered desirable to introduce a time delay in the operation of automatic regulators so as to protect against too frequent operation of the regulating mechanism in response to insignificant momentary variations in the regulated condition or quantity. For example, in automatic regulating systems of the type wherein a contact making voltmeter controls the operation of a tap changing transformer the usual contact making voltmeter operates practically instantaneously and in the past the time delay has been introduced by means of an auxiliary time delay relay or by means of a spring drive between an operating motor and the tap changing mechanism. However, the auxiliary relay increases the cost and complexity of the control system for the regulator, while with a spring drive the spring is continuously being partially wound and unwound.

In accordance with our invention we provide a master controller for a regulator which inherently possesses an adjustable time delay of appreciable magnitude, such for example as a maximum 25 seconds. In addition, we provide a controller in which the time delay is an inverse function of the amount of departure from a normal value of the regulated condition or quantity. In this manner, the regulator responds more and more quickly in proportion to the magnitude of the departure from the normal value of the regulated condition, which is a desirable characteristic for a regulating system, in that relatively large disturbances are more quickly corrected than relatively small and unimportant disturbances. The time delay thus gives the system a chance inherently to cancel the small disturbances and consequently wear and tear on the regulator is reduced.

An object of our invention is to provide a new and improved automatic regulator control means.

Another object of our invention is to provide a new and improved regulator master controller having an adjustable inverse time delay characteristic.

Our invention will be better understood from the following description taken in connection with the accompanying drawing and its scope will be pointed out in the appended claims.

In the drawing, Fig. 1 is a diagrammatic showing of a particular embodiment of our invention in the form of an induction disc contact making voltmeter for controlling a tap changing transformer and Fig. 2 is a curve for illustrating the inverse time characteristic of our controller.

Referring now to Fig. 1 of the drawing there is shown therein a transformer 1 connected, by way of example, to an input circuit 2 and to an output circuit 3 whose voltage is to be maintained constant by means of a tap changing mechanism 4 provided on the transformer. Mechanism 4 is driven by an operating motor 5 whose direction of rotation is controlled by our master controller 6, in the form of an induction disc contact making voltmeter. Controller 6 is connected to be responsive to the voltage of circuit 3 through any suitable means, such as a small transformer 7, and it serves to initiate the necessary plus and minus voltage corrections produced by the regulating system. Device 6 comprises a pivotally mounted shaft 8 carrying an induction disc 9 made of any suitable electrical conducting material. Disc 9 is acted upon by a shaded pole operating magnet 10 which is connected to be energized by transformer 7 and which produces a torque on disc 9 which is proportional in magnitude to the square of the voltage of circuit 3. As magnet 10 is shown, this torque is clockwise in direction when the disc is viewed along the axis of the shaft 8 from right to left. For opposing the torque of the magnet 10 there is provided a weight 11 connected by a cord or other suitable flexible connecting means 12 to a spool or pulley 13 on the shaft 8. The weight 11 is so adjusted or proportioned that at normal voltage on the circuit 3 the opposed torques produced by the magnet 10 and the weight 11 are exactly equal so that the disc remains stationary. It should be understood, however, that our invention is not limited to a weight and that an equivalent spring could be used in place of weight 11, if desired.

For adjusting the time delay produced by the device 6 there is provided a drag magnet 14 which may be moved in or out so as to adjust the dragging or damping effect it produces.

Arranged to be moved or driven by shaft 8 is a movable contact 15 which is adapted to cooperate respectively with stationary contacts 16 and 17. The movable contact 15 is connected to one terminal of the transformer 7 by means of a conductor 18 while the other terminal of the transformer 7 is connected to a terminal of the motor 5, and reversing connections or leads 19 and 20 of the motor are connected respectively, with the stationary contacts 16 and 17. Thus, when contact 15 engages either one of contacts 16 or 17 an energizing circuit for the motor 5 is completed so as to cause the motor to operate in the proper direction to raise or lower the voltage of circuit 3.

As the voltage regulation of circuit 3 takes place in steps corresponding to the voltage difference between taps on the transformer, it is necessary that the device 6 maintain the voltage of circuit 3 within a so-called voltage band, which is at least as wide as the voltage between transformer taps, for otherwise the system would be unstable and it would hunt. In order to provide this operation there is fastened to the shaft 8 an adjustable weight 21 which is mounted off-center so as to provide a torque opposing the motion of shaft 8 in either direction from a normal midposition wherein the contact 15 is midway between its extreme contact making positions wherein it is in engagement with contact 16 or contact 17. By adjusting the position of the weight the width of the voltage band held by the regulating system may be controlled, as will be explained more in detail hereinafter.

The operation of our invention is as follows: Assume that supply circuit 2 is being energized by any suitable source of current supply (not shown) and that conditions on circuit 3 are such as to result in normal voltage thereon. Under these assumed conditions the parts of the device 6 will be in the positions shown in the drawing, so that the weight 21 will be hanging straight down and the contact 15 will be midway between the contacts 16 and 17. Assume now that the voltage of circuit 3 should increase above normal. Under these conditions the torque produced by magnet 10 increases so that the disc 9 is rotated in a clockwise direction but as soon as this rotation takes place the weight 21 acting through its supporting lever arm produces a counter-clockwise torque or moment which aids the torque produced by weight 11 so that if the increase in voltage is slight the disc 9 will soon come to rest in a position wherein the weight 21 is somewhere between the position shown in the drawing and the position wherein it is extended horizontally from the shaft 8. The parts are so adjusted that if the voltage of circuit 3 exceeds the normal value by an amount which is substantially one-half the voltage change produced by one tap change on the transformer 3 then the increase in torque produced by magnet 10 is just sufficient to equal the counter torque of weight 21 when it is extended horizontally. Consequently, a voltage increase which is greater than one-half the tap change voltage overcomes the maximum counter torque of the weight 21 and the disc 9 will continue to rotate in a clockwise direction until contact 15 engages contact 16. As soon as contacts 15 and 16 engage an operating circuit for the motor 5 is completed and the motor is energized in such a manner as to cause it to rotate in the proper direction to cause the tap changing mechanism 4 to lower the voltage of circuit 3. As shown in the drawing this would mean that the moving contact of the mechanism 4 would rotate in a clockwise direction to the uppermost tap on the transformer.

It should be noted that the counter torque of weight 21 decreases progressively as the weight moves from the horizontal position to the vertical position so that, although there may be a very slight net torque in the clockwise direction produced by the magnet 10 when the weight 21 is horizontal, by the time the weight 21 gets to the vertical position the unbalance torque will be considerably increased so as to provide a torque which is sufficiently strong to result in firm engagement of the contacts 15 and 16. Furthermore, as the clockwise torque produced by the magnet 10 increases with the voltage of circuit 3 the speed of disc 9 in moving from the position where the weight 21 is horizontal to the position where the weight 21 is substantially vertical, and the contacts 15 and 16 are in engagement, will increase with the voltage so that the time required for the contacts to engage will vary inversely with the voltage increase on the circuit 3. This is very desirable, as this inverse time characteristic provides quick correction of large voltage changes while introducing a time delay in the correction of small voltage changes so that if these changes disappear within this time delay the regulating mechanism will not be subjected to unnecessary operation.

In a similar manner, if the voltage of circuit 3 decreases below normal, the torque of magnet 10 becomes less than the torque of weight 11 and the disc rotates in a counter-clockwise direction, the weight 21 acting in a similar manner as with increases in voltage, so that only when the voltage falls an amount corresponding to one-half a tap change voltage will the unbalance torque be sufficient to cause the weight 21 to move beyond the horizontal position to the vertical position and cause contact 15 to engage contact 17. When these contacts engage the motor 7 is energized for operation in a reverse direction so that the tap changing mechanism operates to cause the transformer to raise the voltage of circuit 3.

In Fig. 2 the curve of the operating characteristic of our invention is shown for a particular case in which the voltage band is a 3% band and the magnet 14 is adjusted to provide a maximum time delay of about six seconds. As will be seen from Fig. 2, if the voltage of circuit 3 changes within plus or minus 1½% of normal it is not corrected, as this change is within the voltage band corresponding to all positions of weight 21 below the horizontal in either direction. If, however, the voltage rises or falls above plus or minus 1½%, respectively, the time required for the contacts of device 6 to close varies inversely from the maximum of about six seconds to a minimum time which varies inversely with the percentage change in voltage. As shown in Fig. 2, a 3% plus or minus change causes the device 6 to close its contacts in approximately two seconds.

A greater time delay and increased operating torque can obviously be obtained by interposing a simple gear reduction between shaft 8 and disc 9.

While we have shown and described a particular embodiment of our invention, it should be obvious to those skilled in the art that changes and modifications may be made without departing from our invention, and consequently we aim in the appended claims to cover all such changes and modifications as fall within the true spirit and scope of our invention.

What we claim as new and desire to secure by Letters Patent of the United States, is:

1. In a regulating system, a master controller adapted to initiate necessary plus and minus corrections in a quantity to be regulated in response to variations in said quantity, and means for introducing a positive time delay in the initiating action of said controller which varies substantially inversely with the magnitude of the variation of said quantity from a predetermined value.

2. In combination, translating means having an operating condition to be regulated and automatic regulating means for said condition, said automatic regulating means including means for introducing a positive time delay in the operation of said automatic regulating means which varies inversely with the magnitude of a departure of said operating condition from a predetermined value.

3. In combination, translating means having an operating condition to be regulated, regulating means for said condition, means responsive to greater than predetermined minimum departures from a normal value of said conditon for initiating a regulating action, and means included in said last mentioned means for introducing a time delay in its action which varies substantially inversely with the magnitude of all said greater than predetermined minimum departures.

4. In combination, translating means having an operating condition to be regulated, automatic regulating means for said condition, said automatic regulating means including means for preventing a regulating operation unless said operating condition departs a given amount from a normal regulated value, and means for varying the time of response of said regulating means to all departures of said operating condition beyond said given amount inversely with the magnitude of said last mentioned departures.

5. In combination, translating means having an operating condition to be regulated, automatic means for regulating said condition in steps, said means including a device responsive to plus and minus variations of said condition from an ideal value which are slightly greater respectively than half a regulated step of said conditon for initiating the proper regulating action, and means for introducing a time delay in the operation of said last mentioned means which varies inversely with the magnitude of all variations in said condition which are in excess of said plus and minus variations.

6. In a circuit controller for electrical regulators, in combination, a movable element having two circuit controlling positions between which is a midposition, means for urging said element toward one of its circuit controlling positions in accordance with the magnitude of a condition to be regulated, means for opposing said motion, and additional means for opposing motion of said element from said midposition in either direction with an effect which increases with the motion of said element from said midposition up to a maximum effect which is attained before said element attains either circuit controlling position.

7. A contact making voltmeter comprising, in combination, a pivotally mounted horizontal shaft, an induction disc mounted thereon, a voltage responsive shaded pole operating magnet for applying a rotational torque to said disc in accordance with the voltage applied to said magnet, means for applying a uniform torque to said shaft in opposition to the torque produced by said magnet, an off-center weight fastened to said shaft so as to be rotated therewith, a pair of fixed contacts, a movable contact between said fixed contacts, and means for driving said movable contact from said shaft.

8. In combination, a transformer having tap changing means adapted to be operated under load, and an induction disc contact making voltmeter for controlling said tap changing means, said contact making voltmeter having a normal midposition between a pair of extreme contact making positions which latter are attained only by at least a substantial portion of a revolution of the disc of said relay from the position corresponding to the midposition.

LOUIS F. BLUME.
SALVATORE MINNECI.